Oct. 16, 1962 L. C. JESTY 3,059,145
TELEVISION PICTURE DISPLAY DEVICES
Filed Jan. 19, 1960
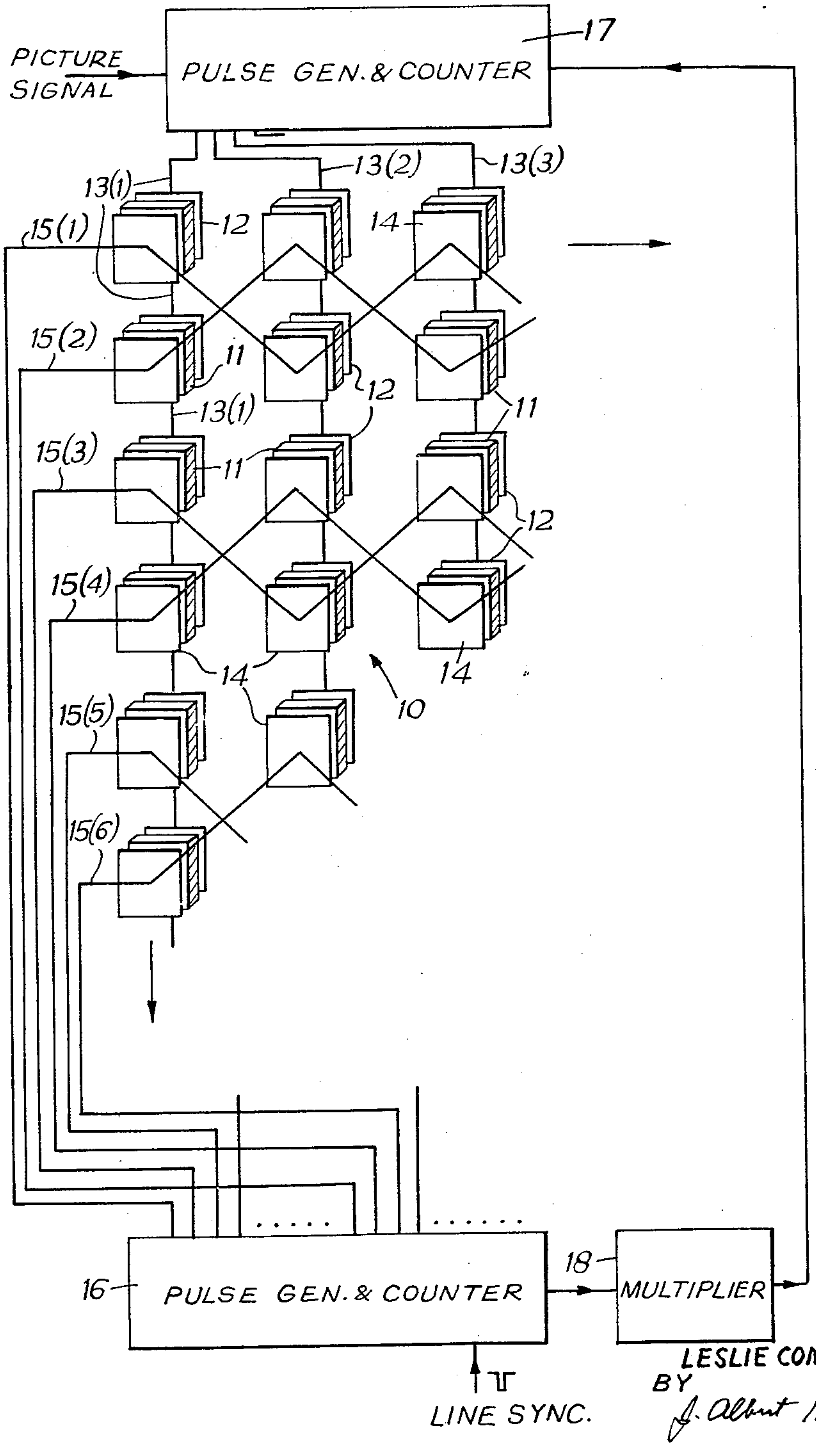
INVENTOR
LESLIE CONNOCK JESTY
BY J. Albert Hultquist
ATTORNEY 3,059,145
Patented Oct. 16, 1962

3,059,145

TELEVISION PICTURE DISPLAY DEVICES

Leslie Connock Jesty, London, England, assignor to Sylvania Thorn Colour Television Laboratories Limited, London, England Filed Jan. 19, 1960, Ser. No. 3,416
2 Claims. (Cl. 315—169)

This invention relates to television picture display devices.

In the provisional and complete specifications of my British Patent 850,024 I describe a particular form of dot interlacing which is capable of giving a sharp flicker-free picture which does not suffer from the defect of line crawling. In the words of the specifications referred to "the particular form of dot interlacing is one in which the scanning means of the receiver are adapted to provide two different scanning rasters in alternate fields, each raster being constituted by a plurality of small areas arranged at points defining a diamond matrix. The two rasters are interlaced in such a way that the small areas of one matrix lie substantially in the centres of the diamonds of the other marix." This is illustrated diagrammatically in FIG. 1 of the drawings accompanying the said provisional specification.

According to the present invention a television picture display device comprises an electroluminescent panel made up of a substantially rectangular array of elementary, individual light-emitting areas connected to a signal source through switching means by means of which a signal may be applied individually to each of the areas in turn, the arrangement being such that, in operation, the signal is applied to two different alternating sequences of elementary areas, one sequence consisting of the odd-numbered areas of the first line of areas, the even-numbered areas of the second line, the odd-numbered areas of the third line, the even-numbered areas of the fourth line, and so on, and the other sequence consisting of the even-numbered areas of the first line, the odd-numbered areas of the second line, the even-numbered areas of the third line, the odd-numbered areas of the fourth line, and so on.

It will be appreciated that this gives rise to the same advantageous dot-interlaced pattern as is described in the aforementioned specifications. Considerable advantage lies in the use of an electroluminescent panel in that this is a flat member of much less bulk than the conventional cathode ray tube and moreover requires smaller operating potentials than a cathode ray tube.

The precise constructional features of the panel and of the switching means employed do not form part of the present invention. Information on these matters may be found in an article by E. A. Sack in the October 1958 issue of the Preceedings of the I.R.E. (p. 1694) or an article by J. A. Rajchamn et al. in the November 1958 issue of the same journal (p. 1808) for example. In the following, more detailed description, only a rudimentary panel is accordingly described.

One embodiment of the invention will now be described by way of example with reference to the accompanying schematic drawing. In the drawing an electroluminescent panel 10 comprises a rectangular array of elementary areas 11, each of which is energised by applying a voltage between contact areas on either side thereof. For simplicity, only a corner of the panel is represented in an exploded, perspective view. The contact areas 12 at the back of the panel are connected in groups to a plurality of "column" leads 13(1), 13(2), and so on, equal in number to the number of areas pei line. The contact areas 14 at the front of the panel are connected in groups to a plurality of "row" leads 15(1), 15(2) and so on, equal in number to the number of lines of areas. On applying a voltage between a row lead and a column lead a voltage is established across one elementary area only, each elementary area corresponding to a different pair of leads.

The first column lead 13(1) is connected to the back contact areas 12 of the first elementary area in each row, the second column lead 13(2) to the back contact areas of the second elementary area in each row and so on.

The first row lead 15(1) is connected to the front contact areas 14 of the odd-numbered elementary areas 11 of the first line and the even-numbered elementary areas of the second line; the second row lead 15(2) to the front contact areas of the even- and odd-numbered elementary areas of the first and second lines respectively; the third row lead 15(3) to the front contact areas of the odd- and even-numbered elementary areas of the third and fourth lines respectively; the fourth row lead 15(4) to the front contact areas of the even- and odd-numbered elementary areas of the third and fourth lines respectively, and so on.

In operation the odd-numbered row leads 15(1), 15(3) and so on are energised in sequence by a pulse generator and counter 16 synchronised with the line synchronising pulses separated out from the received signal. Whilst each row is energised all the column leads are energised in sequence, by a second pulse generator and counter 17 which may be synchronised with the unit 16 via a frequency multiplier 18. This procedure provides one field of the picture. In the interlaced field the even-numbered row leads 15(2), 15(4) and so on are energised in sequence and, again, whilst each row lead is energised all the column leads are energised in sequence.

An energised row lead is held at a fixed potential. However, the potential applied to the column lead energised at any given instant is determined by the amplitude of the received picture signal. This signal is applied to the unit 17 to control, by any suitable gating or modulating process, the amplitudes of the successive pulses fed successively to the leads 13(1), 13(2) and so on.

It will be appreciated that various similar alternative connections can be employed to give the same results. For instance, what have been described above as the row and column leads can be connected to the back and front contact areas of the elementary areas respectively.

Furthermore, it will be seen that the drawing accompanying the present specification corresponds basically to FIG. 3 of the drawings accompanying the aforementioned specification. A device according to the present invention could be made corresponding to FIG. 2 of the aforementioned specification with the advantage that the leads 15(1), 15(2) and so on would not have to cross each other.

The invention is, of course, not limited to the production of black and white pictures but can be employed in colour television. The individual light-emitting areas need not all emit light of the same colour. Alternatively, the phosphors employed may be such that each area can be caused to emit light of different colours by appropriate variations in the frequency of the exciting field, for example.

I claim:

1. An electroluminescent device comprising an MN plurality of electroluminescent cells arranged into M different rows and N different columns, where M and N are integers, each cell including first and second spaced apart electrodes and an electroluminescent layer interposed therebetween, at least one of said electrodes permitting the passage of light therethrough; M different row output terminals; N different column output terminals; means connecting the second electrodes in each column in common to the corresponding column output terminal; means connecting the odd-numbered first electrodes in any odd-numbered row and the even-numbered first electrodes in the even-numbered row adjacent said any odd-numbered row in common to the row output terminal corresponding to said any odd-numbered row; and means connecting the even-numbered first electrodes in said any odd-numbered row and the odd-numbered first electrodes in said adjacent even-numbered row in common to the row output terminal corresponding to said adjacent even-numbered row.

2. An electroluminescent device comprising an MN plurality of electroluminescent cells arranged into M different rows and N different columns, where M and N are integers, each cell including first and second spaced apart electrodes and an electroluminescent layer interposed therebetween, at least one of said electrodes permitting the passage of light therethrough; M different row output terminals; N different column output terminals; means connecting the second electrodes in each column in common to the corresponding column output terminal; means connecting the odd-numbered first electrodes in any odd-numbered row and the even-numbered first electrodes in the even-numbered row adjacent said any odd-numbered row in common to the row output terminal corresponding to said any odd-numbered row; means connecting the even-numbered first electrodes in said any odd-numbered row and the odd-numbered first electrodes in said adjacent even-numbered row in common to the row output terminal corresponding to said adjacent even-numbered row; and means to apply an electrical signal between any selected column output terminal and any selected row output terminal.

References Cited in the file of this patent

UNITED STATES PATENTS

| | | |
|---|---|---|
| 2,774,813 | Livingston | Dec. 18, 1956 |
| 2,839,690 | Kazan | June 17, 1958 |
| 2,856,553 | Henisch | Oct. 12, 1958 |
| 2,877,371 | Orthuber et al. | Mar. 10, 1959 |
| 2,883,582 | Hanlet | Apr. 21, 1959 |
| 2,892,968 | Kallmann | June 30, 1959 |